United States Patent
Latorre

(10) Patent No.: US 11,060,034 B2
(45) Date of Patent: Jul. 13, 2021

(54) PROCESS AND REACTOR FOR CONTINUOUS CHARCOAL PRODUCTION

(71) Applicant: VALLOUREC TUBOS DO BRASIL S. A., Barreiro de Baixo (BR)

(72) Inventor: Fernando Latorre, Bairro Leo Batista (BR)

(73) Assignee: VALLOUREC TUBOS DO BRASIL, S.A., Belo Horizonte MG (BR)

( * ) Notice: Subject to any disclaimer, the term of this patent is extended or adjusted under 35 U.S.C. 154(b) by 0 days.

(21) Appl. No.: 16/753,058

(22) PCT Filed: Oct. 2, 2018

(86) PCT No.: PCT/BR2018/050362
§ 371 (c)(1),
(2) Date: Apr. 2, 2020

(87) PCT Pub. No.: WO2019/068159
PCT Pub. Date: Apr. 11, 2019

(65) Prior Publication Data
US 2020/0291300 A1    Sep. 17, 2020

(30) Foreign Application Priority Data
Oct. 2, 2017    (BR) .......................... 102017021185-1

(51) Int. Cl.
*C10B 53/02* (2006.01)
*C10B 1/04* (2006.01)
(Continued)

(52) U.S. Cl.
CPC ................ *C10B 53/02* (2013.01); *C10B 1/04* (2013.01); *C10B 17/00* (2013.01); *C10B 21/18* (2013.01);
(Continued)

(58) Field of Classification Search
USPC ........... 202/120, 150, 221; 201/8, 13, 14, 30
See application file for complete search history.

(56) References Cited

U.S. PATENT DOCUMENTS 2,289,917 A * 7/1942 Lambiotte ............... C10B 53/02
                                                              201/34
4,165,216 A * 8/1979 White ........................ C10B 1/04
                                                              201/34
(Continued)

FOREIGN PATENT DOCUMENTS

FR            872551       6/1942
WO    WO 2009/094736      8/2009

OTHER PUBLICATIONS

International Search Report and Written Opinion for International (PCT) Patent Application No. PT/BR2018/050362, dated Jan. 2, 2019, 14 pages.

*Primary Examiner* — Nina Bhat
(74) *Attorney, Agent, or Firm* — Sheridan Ross P.C.

(57) ABSTRACT

Continuous charcoal production system in a vertical reactor with a concentric charging zone (1) and drying zone (2), a carbonization zone (3), a cooling zone (4) and a discharge zone (5), and a method for recovering energy from carbonization gases for the production of this charcoal, comprising the extraction of carbonization gas from the drying zone (2) and subdividing it into recirculating gas and heating gas, with the remaining gas exceeding the energy required to generate electricity; burning the heating gas in a hot gas generator (11); injecting the recirculating gas into a heat recovery unit (9); injecting the heating gas after combustion into the heat recovery unit (9), indirect heating of the recirculating gas; and reinjecting the heated recirculating gas into the carbonization zone (3) of the reactor (R).

20 Claims, 5 Drawing Sheets

(51) Int. Cl.
*C10B 17/00* (2006.01)
*C10B 21/18* (2006.01)
*C10B 21/22* (2006.01)
*C10B 31/02* (2006.01)
*C10B 41/08* (2006.01)
*C10B 49/04* (2006.01)
*C10B 57/10* (2006.01)

(52) U.S. Cl.
CPC .............. *C10B 21/22* (2013.01); *C10B 31/02* (2013.01); *C10B 41/08* (2013.01); *C10B 49/04* (2013.01); *C10B 57/10* (2013.01)

(56) References Cited

U.S. PATENT DOCUMENTS

| | | | | |
|---|---|---|---|---|
| 4,230,602 A * | 10/1980 | Bowen | ................ | C01B 32/336 502/434 |
| 4,419,185 A * | 12/1983 | Bowen | ................ | C10G 1/02 201/4 |
| 4,465,556 A * | 8/1984 | Bowen | ................ | C10B 53/02 202/99 |
| 4,935,099 A * | 6/1990 | Weiss | ................ | C10B 53/02 201/27 |
| 5,104,490 A * | 4/1992 | Brinkman | ................ | C10B 1/04 202/215 |
| 5,547,548 A * | 8/1996 | Siddoway | ................ | C10B 39/04 201/28 |
| 5,584,970 A * | 12/1996 | Schmalfeld | ................ | C10B 53/02 201/27 |
| 7,264,694 B2 * | 9/2007 | Merrell | ................ | B01J 6/004 201/19 |
| 8,986,507 B2 * | 3/2015 | Schottdorf | ................ | C10B 49/06 201/3 |
| 9,321,966 B2 * | 4/2016 | Wang | ................ | C10L 5/447 |
| 2011/0290633 A1 * | 12/2011 | de Melo | ................ | C10B 57/02 202/124 |

* cited by examiner

PROCESS AND REACTOR FOR CONTINUOUS CHARCOAL PRODUCTION

CROSS REFERENCE TO RELATED APPLICATIONS

This application is a national stage application under 35 U.S.C. 371 and claims the benefit of PCT Application No. PCT/BR2018/050362 having an international filing date of 2 Oct. 2018, which designated the United States, which PCT application claimed the benefit of Brazilian Patent Application No. 102017021185-1 filed 2 Oct. 2017, the contents of each of which are incorporated herein by reference in their entireties.

This invention refers to a reactor and a system for the continuous production of high-grade charcoal for the metallurgy industry. The invention also refers to a method for recovering energy from carbonization gases for the continuous production of charcoal, which is applicable to the reactor and the continuous charcoal production system. This method provides greater energy efficiency and makes better use of the chemical energy deriving from carbonization in the charcoal production process, reducing consumption of other energy sources.

STATE OF THE ART

Reactors for the continuous production of charcoal are known, for example, from documents FR 2416931, U.S. Pat. Nos. 5,584,970 and 1,739,786 and PI 0800063-8.

FR 2416931 discloses a process for the continuous production of charcoal in a moving bed reactor, comprising a reduced section charging stack H, wherein the level of wood is periodically controlled to ensure that the stack is constantly charged with wood. Then a vat C with a substantially larger section is provided, wherein the wood is progressively dried and then carbonized under the effect of the hot gas coming from the lower section of said vat. The pyroligneous vapors are evacuated from the vat through an extraction line and conveyed into a chamber F which connects to a lower section of the vat C, into which chamber the hot gases coming from a heat exchanger E are simultaneously injected. The gas products are evacuated from a chamber D, located essentially at the same level as chamber F, and conveyed to a space connected to the heat exchanger E. Below the carbonization zone of the vat C is a compartment R for cooling the charcoal by recycling the gas extracted from said compartment through a water-cooled line inside a column L and reinjecting it into the compartment.

U.S. Pat. No. 5,584,970 discloses a reactor 1 comprises an input chamber 2, a preheating zone 3 for drying the wood, a carbonizing zone 4, an optional calcining zone 5, and a cooling zone 6. Between the different zones are annular chutes 28 and 38 having a conical shape, whereby the hot gas extracted at the outlet of the carbonization zone is circulated, mixed with (colder) exhaust gas and reinjected around the chute located between the drying zone and the carbonization zone. The cooling gas that feeds the cooling zone is extracted around the lower cone and passed through a cooler. Exhaust gas containing combustible elements is extracted from the top of the preheating zone and partially transported to a combustion chamber, and the gas extracted from this chamber is used to preheat the air in heat exchangers before being discharged.

In particular in FR 2416931, and on a smaller scale in U.S. Pat. No. 5,584,970, the charging zone has a smaller cross-section than the subsequent preheating zone and partially U.S. Pat. No. 1,739,786, this overlap has the function of, during the extraction of the hot gases at the top of the preheating zone, keeping the wood charge off the gas outlet, thus preventing the sawdust from being conveyed into the gas conduit, consequently avoiding clogging and the need for frequent maintenance.

Patent PI 0800063-8 also discloses a vertical reactor for the continuous production of charcoal, whose objective lies in reducing sawdust being dragged along with gases extracted from the preheating zone, without substantially altering the shape and dimensions of the reactor. To do so, the charging zone is arrayed eccentrically in relation to the drying zone, with the outlet for extracting gases from the drying zone situated substantially in the section with the largest annular space formed by the extension of the charging zone into the drying zone. Patent PI 0800063-8 also mentions that the charging zone has a diameter of about 2,000 mm and the drying zone has a diameter of 2,500 mm, whereby the vertical geometric axis of the charging zone is displaced D by approximately 100 mm from the vertical geometric axis of the drying zone. The ratio between the diameters of the charging zone and the drying zone is 0.8.

Although this eccentric array of the charging and drying zones is efficient for reducing sawdust drag, even with diameters whose size is relatively similar, it creates a preferential flow zone in the kiln where carbonization is greater. This interferes in the carbonization heat profile in the kiln, with adverse effects on its performance.

PURPOSE OF THE INVENTION

The main purpose of this invention is a reactor of the described type that provides better control of the carbonization zone heat profile, which implies better modernization of the physical and chemical properties of the resulting charcoal. This fact allows greater charcoal mass yield by wood mass, maximizing yield in the metallurgy industry Another purpose of the invention is to provide a technology that makes better use of the chemical energy in the carbonization gases. Furthermore, the solution is also designed to reduce woodchip drag when extracting vapors at the top of the reactor.

It another purpose of the invention is the distribution of the heated recirculating mass of carbonization gases in a homogeneous manner through a ring in the carbonization zone base.

BRIEF DESCRIPTION OF THE INVENTION

The purposes of the invention are obtained through a method for recovering energy from carbonization gases for the continuous production of charcoal in a reactor with a vertical structure comprising in sequence: a top charging zone, a drying zone, a carbonization zone, a cooling zone and a discharge zone, with the method comprising the steps of:

extracting carbonization gas from the top of the reactor drying zone and dividing it into fractions that comprise at least the recirculating gas mass and the heating gas mass;

conducting the combustion of the heating gas mass in a hot gas generator;

injecting the recirculating gas mass into a heat recovery unit;

injecting the heating gas mass after combustion in the heat recovery unit, not in contact with the recirculating gas mass, in order to heat the recirculating gas mass; and reinjecting the heated recirculating gas mass through the heat recovery unit in the carbonization zone base of the reactor.

During the step of extracting and subdividing the carbonization gas from the reactor, the carbonization gas may be subdivided into three fractions, whereby the third fraction is a remaining mass that is sent to a thermo-power plant. Furthermore, after combustion and after being injected on to the heat recovery unit, the heating gas mass may then be used for drying wood that will be subsequently fed into the charging zone of the reactor.

The purposes of the invention are also attained through a continuous charcoal production system comprised of a reactor with a vertical structure comprising in sequence: a top charging zone, a drying zone with at least two outlets for extracting carbonization gas at its top, a carbonization zone, a cooling zone and a discharge zone, and a gas recovery circuit in fluid communication with at least two drying zone outlets. This circuit is comprised of a heat recovery unit within which the recirculating gas mass extracted from the reactor circulates, where this recirculating masses heated and reinjected into the carbonization zone base, and a hot gas generator that receives and handles the combustion of the heating gas mass extracted from the reactor, and discharges the heating gas after combustion into the heat recovery unit for heat exchange, not coming into direct contact with the recirculating gas mass in the heat recovery unit.

The system may also be comprised of a wood dryer, into which the heating gas is fed after combustion and after running through the heat recovery unit. A pipeline may also be installed, connected to the reactor outlets, carrying to a thermo-power plant a remaining mass of the carbonization gas extracted from the reactor that exceeds the energy requirements of the system.

The system may also be comprised of a tubular ring surrounding the carbonization zone base, the ring being in fluid communication with the heat recovery unit, and comprising a plurality of connections distributed regularly around the carbonization zone, establishing fluid communication between the interior of the ring and the carbonization zone base, whereby the recirculating gas mass flows from the heat recovery unit to the ring, and through the connections to the carbonization zone base.

In the system according to the invention, the charging zone of the reactor has a cross-section smaller than the drying zone and has an extension into the interior of the drying zone, forming an annular space around the extension, with the charging zone arrayed concentrically in relation to the drying zone, and wherein the ratio between the diameter of the charging zone DC and the diameter of the drying zone DS is between 0.68 and 0.72. This system is adapted to handle the method described above.

The purposes of the invention are also attained through a reactor for continuous charcoal production, with a vertical structure comprising in sequence: a top charging zone, a drying zone, a carbonization zone, a cooling zone and a discharge zone, whereby the charging zone has a cross-section smaller than the drying zone and has an extension into the interior of the drying zone, forming an annular space around the extension, whereby at the top of the drying zone, at least two outlets for extracting gases are arrayed in a diametrically opposed manner, and the charging zone is arrayed concentrically in relation to the drying zone, and wherein the ratio between the diameter of the charging zone DC and the diameter of the drying zone DS is between 0.68 and 0.72.

The reactor may also comprise a lower tubular ring surrounding the cooling zone base that is in fluid communication with its interior, and an upper tubular ring surrounding the top of the cooling zone, in fluid communication with its interior. A heat exchanger has an inlet in fluid communication with the upper ring for extracting carbonization gas at the top of the cooling zone, and an outlet in fluid communication with the lower ring, whereby carbonization gas drawn from the cooling zone flows through the upper ring and from there through the heat exchanger to the lower ring and back to the cooling zone base.

BRIEF DESCRIPTION OF THE FIGURES

The invention will be described in greater detail below, based on an example of an embodiment illustrated in the Figures. The Figures show.

DETAILED DESCRIPTION OF THE INVENTION

Figure 1A:
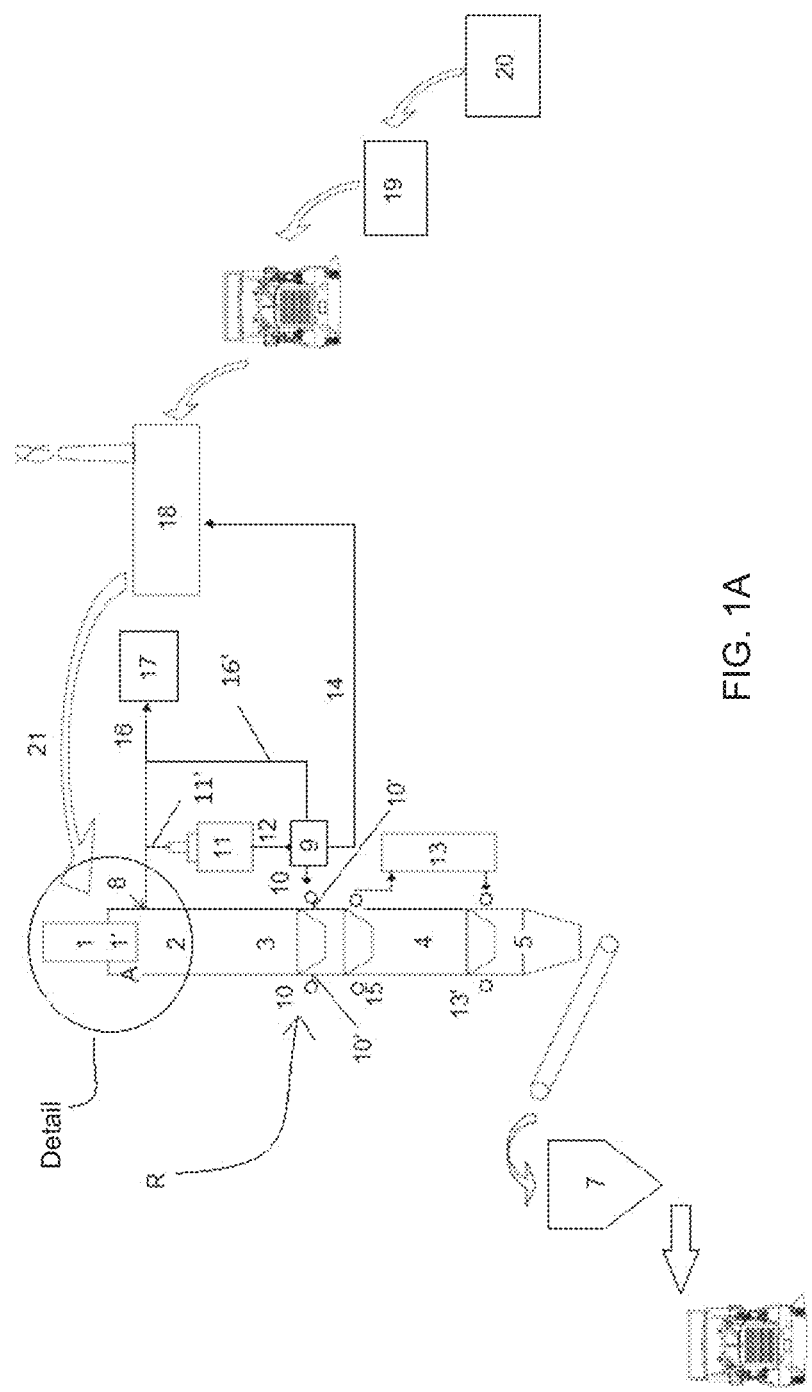
FIG. 1A a simplified schematic view of the different zones of a continuous charcoal production reactor, including external equipment and the charging and discharging steps.

As shown in FIG. 1A, in the charcoal production process the wood which is initially wet after felling in the forest 20 is conveyed to a wood chipper 19. The output from this process is conveyed to a dryer 18 and is then carried in a tipper-bucket 21 on rails up to the top of the charging zone 1 of the reactor R of a continuous charcoal production system.

The carbonization reactor R comprises the charging zone 1 at its top, below which it extends into a drying zone 2, whose diameter is larger than that of the charging zone 1. The following are arrayed under the drying zone 2 in descending sequence: a carbonization zone 3, a cooling zone 4 and a discharge zone 5.

Figure 1B:
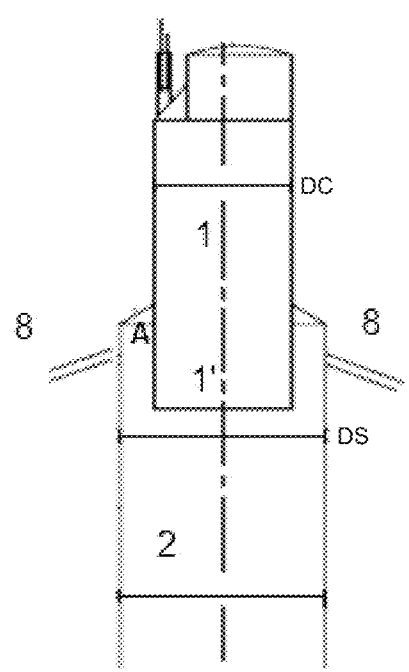
FIG. 1B expanded view of a detail in FIG. 1A of the charging and drying zones.

A detail of FIG. 1A is expanded in FIG. 1B. Consequently, FIG. 1B shows that the charging zone 1 extends into a drying zone 2 through an extension 1'.

The charging zone 1 has a diameter that is smaller than the diameter of the drying zone 2, forming a double pipe region with an annular space A around the charging zone extension 1', in the drying zone 2. The diameter of the charging zone 1 is also some 30% smaller than the diameter of the charging zone of reactors at the state of the art. Preferably, the ratio between the diameter of the charging zone DC and the diameter of the drying zone DS is between 0.68 and 0.72. According to a preferred embodiment of the invention, the diameter of the charging zone (DC) is 1.80 m while the diameter of the drying zone (DS) is 2.50 m. As a result, the annular space A has an area that is larger, compared to reactors at the state of the art.

In addition to this increase in the annular space A between the charging zone extension 1' and the drying zone 2, there are at least two carbonization gas extraction outlets 8 in the upper part of the drying zone, opposite each other at 180°, in order to divide the flow at the top of the reactor. The association of using at least two outlets 8 with the increased annular space means that the speed of the gas in the reactor is reduced, and the internal flow in the reactor is more uniform. This allows the carbonization gases to be extracted at slower speeds, keeping the same necessary flow rate, substantially reducing the amount of unwanted wood matter carried along, such as sawdust or debris, thus ensuring better distribution and uptake of gases drawn through the extraction outlets 8.

The vertical axes of the charging zone cylinder 1 and the drying zone cylinder 2 are vertically aligned, whereby charging zone 1 and drying zone 2 are concentric.

The use of two extraction outlets 8 insurers more homogeneous gas flow control. Together with the homogeneous distribution of the recirculating mass of gases heated in the carbonization zone base as described below, this control endows the reactor with a more accurate heat profile.

When the reactor R is charged and in operation, new wood is fed into charging zone 1, whereby the drop of the entire contents of the reactor R is controlled through opening the valves in discharge zone 5.

As a result, charcoal production speed can be controlled through opening and closing these valves, which intervenes in the physical and chemical characteristics of the resulting charcoal. Opening and closing these valves also allows the respective continuity of the charcoal production process.

While the wood is running through the drying zone 2 of the reactor, it loses its moisture and the pyrolysis phase begins in carbonization zone 3. The wood carbonization temperature is a function of the desired fixed carbon content, whereby a temperature of 400° C. is normally used.

In the reactor according to the invention, gases are circulated that are drawn from the extraction outlets 8 and fed back on to the carbonization zone base 3, known as recirculation gases or recirculating mass. In addition to these gases, new gases are also formed within the reactor, deriving from carbonization. A method for recovering energy from the carbonization gases is put into operation in order to recirculate these gases in an optimized manner, which will be described here.

The carbonization temperature in the reactor is attained through the energy contained in the recirculating mass that is reinjected into the reactor through a pipe 10 in a ring 10' in the carbonization zone base 3. However, it is important that this recirculating mass is reheated before injection, which will be explained below.

FIG. 1A also shows the gas recovery circuit of the continuous charcoal production system according to the invention, where heat energy is recovered from the carbonization gases. Gases extracted from the top of the reactor are divided into three fractions, namely: a heating gas mass that is taken to a hot gas generator 11 through the first pipe 11', the recirculating mass that is taken to the recovery unit 9 through the second pipe 16' and the remaining mass that runs through the third pipe 16 to the thermo-power plant 17. The first pipe 11', the second pipe 16' and the third pipe 16 are in fluid communication with the outlets 8 of the reactor.

The gas fraction produced during carbonization that is piped to the hot gas generator (HGG) 11 is used to provide heat for the process. The combustion of these gases is handled through an excess of atmospheric air forced into the hot gas generator 11 above the stoichiometric condition.

The remaining fraction or remaining mass of the gases produced during carbonization and not needed to provide energy for the reactor R is carried by pipe 16 to the thermo-power plant 17.

In turn, the smoke resulting from combustion leave the hot gas generator 11 through a pipe 12 and run to a heat recovery unit 9 where they indirectly heat the recirculating mass of carbonization gases. The recirculating mass is then from the heat recovery unit 9 through the tubular ring 10 onto the carbonization zone base 3 and the heat energy in this mass ensures the final temperature of the carbonization zone and control of the heat profile of the reactor R. As the ring 10 surrounds the carbonization zone base 3, a plurality of connections 10' between the ring and the reactor that are spread around the circumference of the carbonization zone 3, allow fluid communication between the interior of the ring 10 and the carbonization zone base 3. In other words, the circulating mass enters the zone base 3 in a homogeneous manner, which allows a better heat profile in the carbonization zone 3.

After firing, the mass of heating gases exchanges heat with the recirculating mass in the heat recovery unit 9 and runs through the pipe 14 for secondary use of the remaining heat energy, with this heat energy used to dry wood in the dryer 18. Drying the wood ensures enhanced efficiency for converting wood into charcoal.

This construction of the gas recovery circuit is fairly simple and energy-efficient, as Bernie takes place without excess air and the heat in these smoke indirectly heats up the recirculating mass, as this recirculating gas mass must effectively be heated prior to injection into the reactor R. The gases forming the recirculating mass are heated in the recovery unit 9 by the smoke or the burned heating gas mass produced in the hot gas generator 11, although with no direct contact between the recirculating mass and the heating gas mass burned in the hot gas generator 11, as will be described below.

The composition of the recirculating gas mass is similar to that of the carbonization gases in the reactor, namely: oxygen-free. The absence of oxygen in the recirculating mass means that there is no charcoal combustion in the carbonization zone base 3, which allows efficient control of the heat profile, with better charcoal yield and control over the physical and chemical quality of the resulting charcoal.

Figure 2:
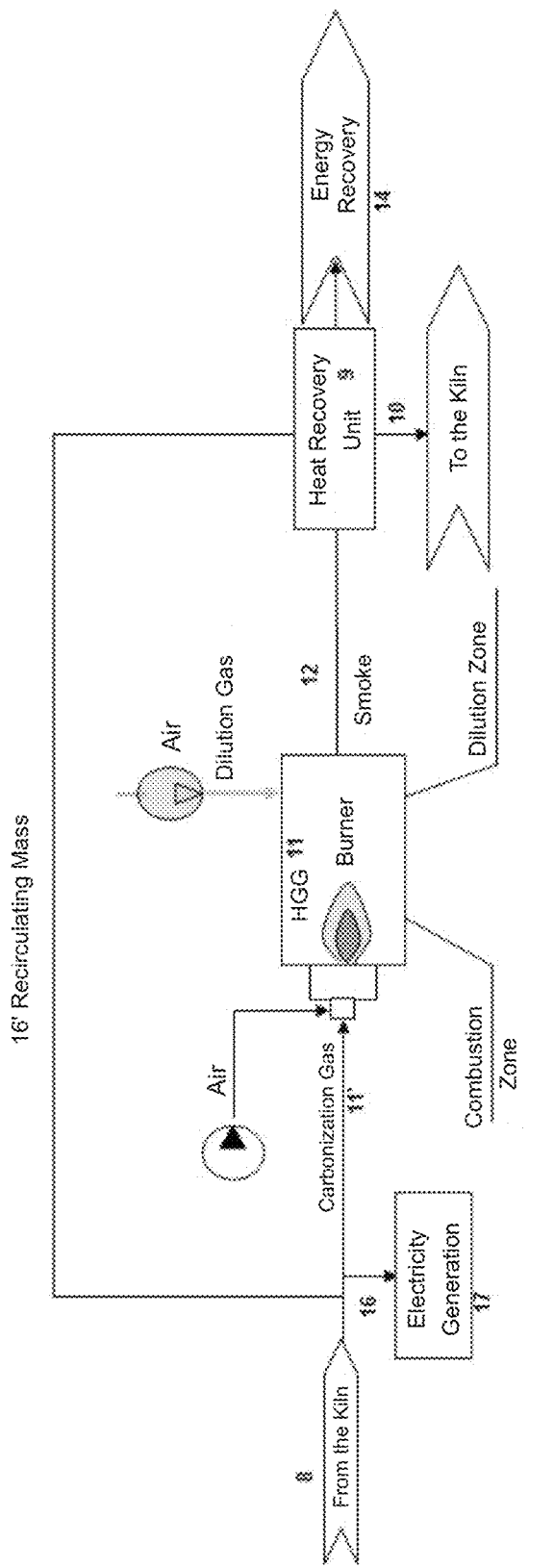
FIG. 2 the system for burning the carbonization gases and heating the recirculating mass that provides energy and maintains the heat profile of the reactor.

FIG. 2 clearly shows that gas from the extraction outlets 8 at the top of the reactor R is subdivided, with one part piped back into the kiln, forming the recirculating mass. However, as mentioned, this recirculating mass must be heated before re-entering the reactor, through the ring 10 on the carbonization zone base 3, in order to reach the ideal carbonization temperature. According to the method for recovering energy from gases addressed by the invention, this heating process is handled through the heat recovery unit 9 that is in fact a heat exchanger 9, in which the smoke or the burned heating gas mass from the generator 11 to not enter into direct contact with the recirculating mass. Control of the recirculating mass temperature is handled through piping excess atmospheric air into the hot gas generator 11. This excess air ensures full combustion of the hot gas in the hot gas generator 11. However, increasing the amount of excess atmospheric air injected into the hot gas generator 11 lowers the temperature of the heating gas mass burned in the hot gas generator 11 piped to the recovery unit 9, which in turn allows carbonization temperature control.

As the heating gas mass burned in the hot gas generator 11 is used only to heat the recirculating mass through a heat exchanger, namely: recovery unit 9, in other words, not coming into direct contact therewith, it is possible to heat this recirculating mass without causing unwanted clogging of the reactor through the condensation of oils and other components, in contrast to the state of the art.

FIG. 1A shows cooling zone 4 located below carbonization zone 3. In this 4, the charcoal runs down against the carbonization gases cooled in a heat exchanger 13. Furthermore, the actual carbonization gases are sucked up through an exhaust outlet on tubular ring 15 at the top of cooling zone 4, and then piped to a heat exchanger 13 and reinjected through ring 13' into cooling zone base 4.

Under cooling zone 4 is discharge zone 5, comprised of two chambers and functioning like a lock-gate, stopping air from entering the furnace during discharge operations. In turn, the resulting charcoal is sent to silo 7 and from there it is used for consumption purposes.

Figure 3:
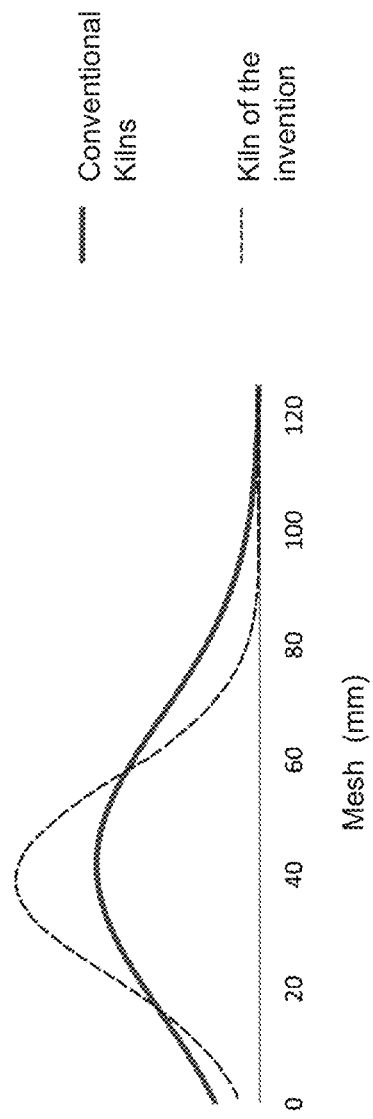
FIG. 3 distribution graph comparing the charcoal mesh obtained through the invention in question with the charcoal mesh produced by conventional kilns at the state of the art.

Proving the efficiency of the system described above, the graph shown in FIG. 3 compares the type of charcoal obtained through the reactor according to the invention with the charcoal obtained from conventional masonry kilns. This graph shows two curves. The more scattered bottom curve with greater variance (more scattered) shows the mesh distribution (in millimeters) of charcoal produced in conventional masonry kilns. The more tightly clustered top curve with less variance (more tightly clustered) shows the normal mesh distribution of the charcoal produced by the reactor addressed by the invention. As the normal curve is more tightly clustered in the center, with less variance, it is clear that the charcoal obtained through the invention offers appreciably greater homogeneity than the charcoal obtained from conventional masonry kilns. This more homogeneous mesh directly impacts charcoal use in the downstream processes where it will be employed, such as better steel production control, for example, with direct implications on the resulting quality.

Figure 4:
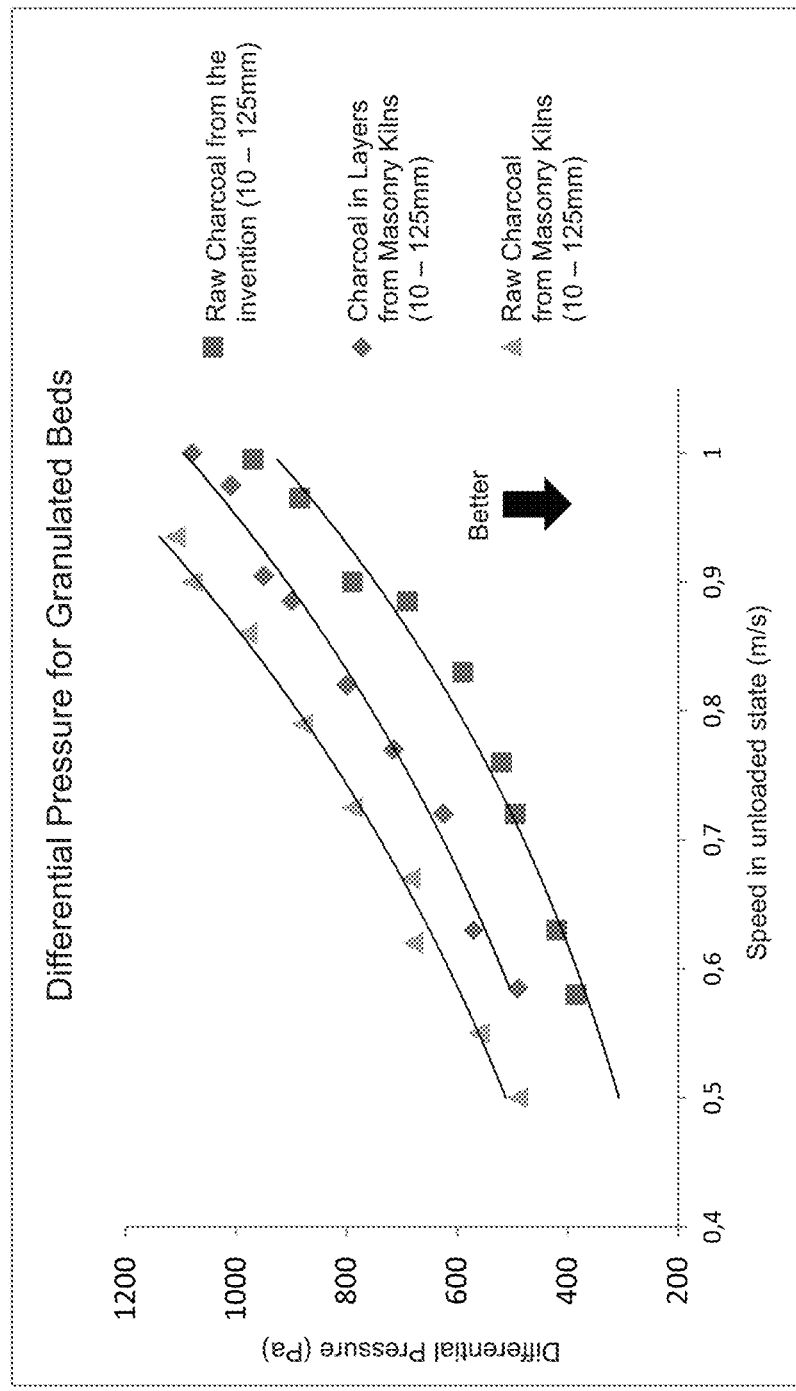
FIG. 4 graph showing the results of charcoal bed permeability tests, comparing the product obtained through the invention with the previous technique.

Finally, the differential pressure flow rate speed curves in FIG. 4 compare the permeability quality of the charcoal bed obtained through the invention with charcoal from conventional masonry kilns. Permeability is the property through which a bed allows fluid to flow through its particles with greater or lesser ease. Beds with charcoal particles whose dimensions are more homogeneous allow easier throughflow and are more evenly distributed, in other words, they are endowed with greater permeability. The graph in FIG. 4 shows that the lower the differential pressure in other words, the closer the curve is to the abscissa (horizontal or x) axis the better the permeability, as indicated by the arrow in this graph. It is noted that the raw charcoal produced through this invention is endowed with better permeability than raw charcoal and layered charcoal from conventional masonry kilns.

This invention consequently attains the desired goals of providing a reactor and a system for the continuous production of charcoal, together with a method for recovering energy from carbonization gases with greater energy efficiency, able to produce higher grade charcoal one at the same time eliminating the risk of clogging the equipment. The proposed rules are reached through this invention, due to the fact that the gases are burned completely with excess air, as well as the fact that the heat energy generated through this learning process indirectly heats a recirculating fluid comprised of the carbonization gases. Temperature control of the recirculating mass without coming into contact with smoke and without oxygen allows control of the reactor heat profile, the carbonization yield and the grade of the resulting charcoal. This consequently contributes to a better heat profile with no undesirable halts and operations due to clogging caused by the condensation of pyroligneous vapors.

Having described an embodiment merely as an example, it must be understood that this invention may be materialized in other ways, with its scope limited only by the following Claims, including characteristics equivalent to those specifically defined herein.

What is claimed is:

1. A method for recovering energy from carbonization gases for the continuous production of charcoal in a reactor with a vertical structure comprising in sequence: a top charging zone, a drying zone, a carbonization zone, a cooling zone and a discharge zone, comprising:
    extracting carbonization gas from a top of the drying zone of the reactor and subdividing it into fractions that comprise at least a heating gas conveyed in a first pipe to a hot gas generator and a recirculating gas conveyed in a second pipe to a heat recovery unit;
    conducting the combustion of the heating gas in the hot gas generator;
    injecting the recirculating gas into the heat recovery unit;
    injecting the heating gas after combustion onto the heat recovery unit, for indirect heating of the recirculating gas; and
    reinjecting the recirculating gas heated by the heat recovery unit into the carbonization zone base of the reactor.

2. The method according to claim 1, wherein during the extracting and subdividing the carbonization gas from the reactor, the carbonization gas is subdivided into three fractions, whereby a third fraction is a remaining gas that is sent to a thermo-power plant via a third pipe.

3. The method according to claim 1, wherein after combustion and after injection onto the heat recovery unit for indirect heating, the heating gas is then used to dry the wood that will be subsequently fed into the charging zone of the reactor.

4. The method according to claim 1, further comprising controlling a temperature of the recirculating gas reinjected into the carbonization zone base of the reactor by controlling an amount of atmospheric air forced into the hot gas generator.

5. The method according to claim 1, wherein condensable gases from carbonization are recovered in a gas recovery circuit.

6. The method according to claim 1, wherein vegetable tar and pyroligneous extract are produced from the condensation of condensable carbonization gases under a controlled thermal profile.

7. A system for continuous charcoal production, comprising:
    a reactor with a vertical structure comprising in sequence: a top charging zone, a drying zone with at least two outlets for extracting a carbonization gas at its top, a carbonization zone, a cooling zone and a discharge zone, and
    a gas recovery circuit in fluid communication with at least two outlets of the drying zone, wherein the gas recovery circuit comprises:
        a heat recovery unit within which recirculating gas extracted from the reactor circulates, where this recirculating gas is heated and reinjected into a base of the carbonization zone; and
        a hot gas generator that receives and handles the combustion of a heating gas extracted from the reactor, discharging heating gas after combustion onto the heat recovery unit for indirect heat exchange with the recirculating gas in the heat recovery unit.

8. The method according to claim 1, wherein vegetable tar and pyroligneous extract are recovered in the interconnection from the top of the reactor to the heat recovery unit, where the recirculating gas passes.

9. The method according to claim 1, wherein vegetable tar and pyroligneous extract are recovered in the interconnection between the top of the reactor and an inlet of the hot gas generator.

10. The method according to claim 5, wherein the vegetable tar and pyroligneous extract recovered in the interconnection between the top of the reactor and the thermal-power plant.

11. The method according to claim 5, wherein the recovered condensable gases are stored in tanks for storage.

12. The system according to claim 7, wherein condensable gases are recovered from the carbonization gas.

13. The system according to claim 7, further comprising a wood dryer, into which the heating gas is fed after combustion and after running through the heat recovery unit.

14. The system according to claim 7, further comprising a pipe in communication with the at least two outlets of the reactor that carries a remaining gas of the carbonization gas extracted from the reactor to a thermo-power plant.

15. The system according to claim 7, further comprising a tubular ring surrounding the carbonization zone base, the ring being in fluid communication with the heat recovery unit, and comprising a plurality of connections distributed regularly around the carbonization zone, establishing fluid communication between an interior of the ring and the carbonization zone base, whereby the recirculating gas flows from the heat recovery unit to the ring and through the connections to the carbonization zone base.

16. The system according to claim 7, wherein:
the charging zone of the reactor has a cross-section smaller than the drying zone and has an extension into the interior of the drying zone, forming an annular space around the extension, and
the charging zone is arranged concentrically in relation to the drying zone, wherein the ratio between a diameter of the charging zone and a diameter of the drying zone is between 0.68 and 0.72.

17. The system according to claim 7, wherein the hot gas generator performs full combustion with excess atmospheric air of the heating gas extracted from the reactor, before discharging the heating gas onto the heat recovery unit for indirect heat exchange with the recirculating gas in the heat recovery unit.

18. The system according to claim 7, wherein it performs a method for recovering energy from carbonization gases for the continuous production of charcoal, said method comprising:
extracting carbonization gas from a top of the drying zone of the reactor and subdividing it into fractions that comprise at least a recirculating gas and a heating gas;
conducting the combustion of the heating gas in the hot gas generator;
injecting the recirculating gas into the heat recovery unit;
injecting the heating gas after combustion onto the heat recovery unit, for indirect heating of the recirculating gas; and
reinjecting the recirculating gas heated by the heat recovery unit into the carbonization zone base of the reactor.

19. A reactor for continuous charcoal production, with a vertical structure comprising in sequence: a top charging zone, a drying zone, a carbonization zone, a cooling zone and a discharge zone, whereby the charging zone has a cross-section smaller than the drying zone and has an extension extending into the interior of the drying zone, forming an annular space around the extension,
wherein at a top of the drying zone, at least two outlets for extracting gases are arranged in a diametric opposed relationship, and
the charging zone is arranged concentrically in relation to the drying zone, and wherein the ratio between a diameter of the charging zone and a diameter of the drying zone is between 0.68 and 0.72.

20. The reactor for continuous charcoal production, according to claim 19, comprising:
a lower tubular ring surrounding a base of the cooling zone, in fluid communication with an interior of the cooling zone base;
an upper tubular ring surrounding a top of the cooling zone, in fluid communication with an interior of the top of the cooling zone;
a heat exchanger with an inlet in fluid communication with the upper ring for extracting carbonization gas at the top of the cooling zone and an outlet in fluid communication with the lower ring,
whereby carbonization gas drawn from the cooling zone flows through the heat exchanger to the ring and back to the top of the cooling zone.

* * * * *